(12) United States Patent
Choo et al.

(10) Patent No.: US 9,176,555 B2
(45) Date of Patent: Nov. 3, 2015

(54) POWER OVER ETHERNET POWER HARVESTER

(71) Applicant: HEWLETT-PACKARD DEVELOPMENT COMPANY, L.P., Houston, TX (US)

(72) Inventors: Boon Siang Choo, Singapore (SG); Tzye Perng Poh, Singapore (SG); Leng Hoo Tan, Singapore (SG)

(73) Assignee: HEWLETT-PACKARD DEVELOPMENT COMPANY, L.P., Houston, TX (US)

( * ) Notice: Subject to any disclaimer, the term of this patent is extended or adjusted under 35 U.S.C. 154(b) by 318 days.

(21) Appl. No.: 13/754,191

(22) Filed: Jan. 30, 2013

(65) Prior Publication Data

US 2014/0215228 A1    Jul. 31, 2014

(51) Int. Cl.
G06F 1/08       (2006.01)
G06F 1/26       (2006.01)

(52) U.S. Cl.
CPC ............... *G06F 1/266* (2013.01); *G06F 1/263* (2013.01)

(58) Field of Classification Search
CPC .......... G06F 1/26; G06F 9/22; G06F 11/0757
See application file for complete search history.

(56) References Cited

U.S. PATENT DOCUMENTS

| | | | |
|---|---|---|---|
| 7,152,168 B2 | 12/2006 | Boynton et al. | |
| 7,895,456 B2 | 2/2011 | Ferentz et al. | |
| 7,982,336 B2 | 7/2011 | Hiscock et al. | |
| 8,064,179 B2 | 11/2011 | Apfel | |
| 8,205,102 B2 | 6/2012 | Kabbara et al. | |
| 8,595,550 B1* | 11/2013 | Heath et al. | 714/14 |
| 2006/0053324 A1* | 3/2006 | Giat et al. | 713/300 |
| 2011/0266867 A1* | 11/2011 | Schindler et al. | 307/24 |
| 2012/0068576 A1* | 3/2012 | Lee | 310/339 |
| 2012/0319468 A1* | 12/2012 | Schneider et al. | 307/1 |
| 2013/0205352 A1* | 8/2013 | Lipowski et al. | 725/81 |

OTHER PUBLICATIONS

"Cisco StackPower: Efficient Use of Power," White Paper, 2012.

* cited by examiner

*Primary Examiner* — Thomas Lee
*Assistant Examiner* — Chad Erdman
(74) *Attorney, Agent, or Firm* — Hewlett-Packard Patent Department

(57) ABSTRACT

Devices and methods for a communication device having at least one power supply unit coupled to a power connector for providing an operating power for operation of network modules of the communication device and a PoE power for the ports connected to Power over Ethernet (PoE) devices. The PoE power includes a consumable power to power up at least one PoE devices and a leftover power. Further, a PoE power harvester adapter is coupled to a power connector to convert the leftover PoE power into additional operating power for operating additional network modules.

19 Claims, 4 Drawing Sheets

POWER OVER ETHERNET POWER HARVESTER

BACKGROUND

Power over Ethernet (PoE) may include techniques for delivering power and data to PoE devices over network cable, such as Ethernet cable. The network cables may connect a variety of the PoE devices to network modules of a communication device through ports provided onto the communication device. The network modules and the ports of the communication device can be powered by at least one power supply unit (PSU). The PSU generally provides both an operating power for the operation of the network modules and a PoE power to the ports. In such cases, PoE technique is employed to provide the power over data transfer cable, such as an Ethernet cable, used for communication of data. In this way, power can be provided to the PoE devices by the Ethernet cable itself, rather than requiring a separate source of power for the PoE devices.

BRIEF DESCRIPTION OF DRAWINGS

The detailed description is described with reference to the accompanying figures. In the figures, the left-most digit(s) of a reference number identifies the figure in which the reference number first appears. The same numbers are used throughout the figures to reference like features and components.

DETAILED DESCRIPTION

Figure 1:
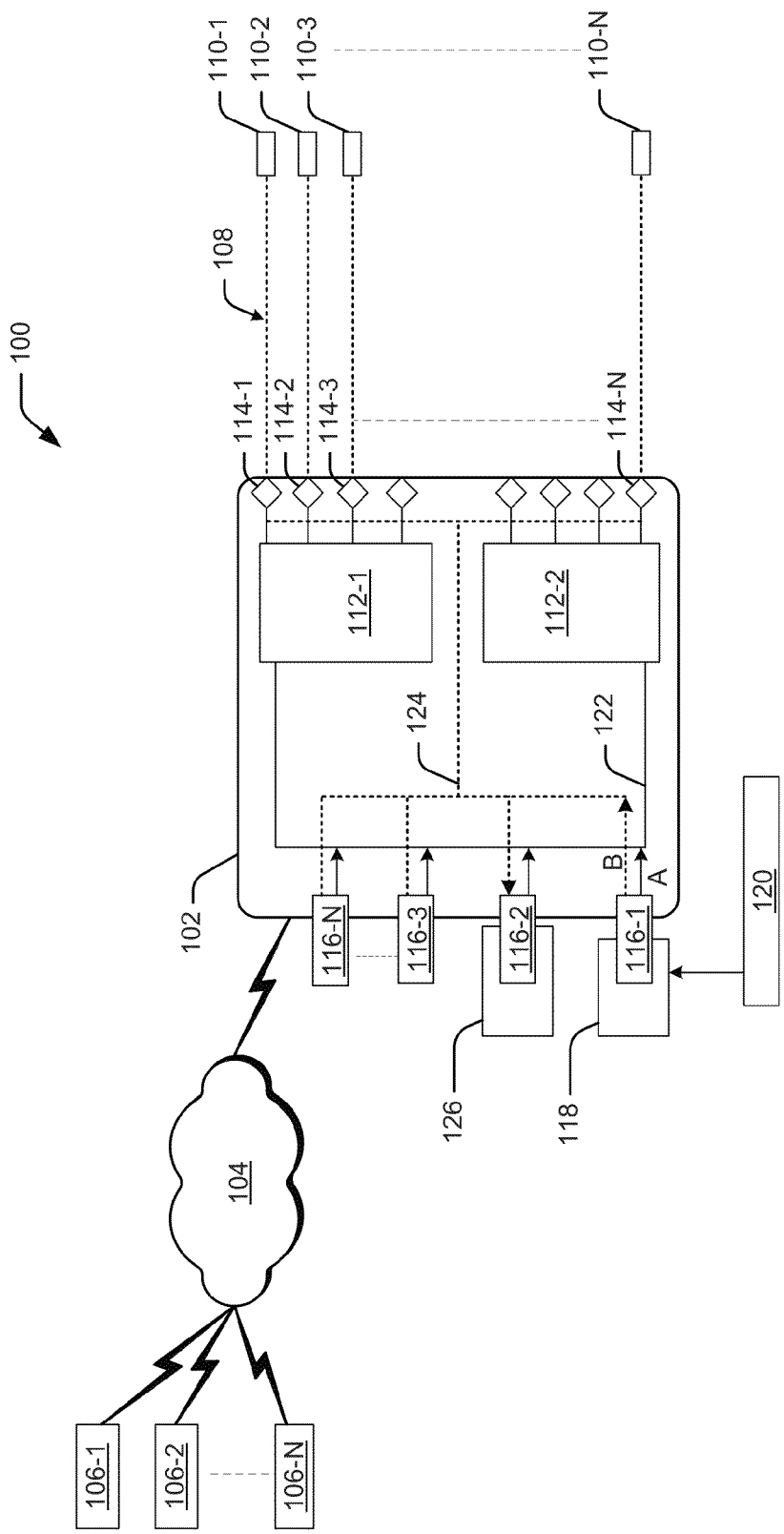
FIG. 1 schematically illustrates a block diagram of a Power over Ethernet (PoE) communication system, according to an example of the present subject matter.

Power over Ethernet (PoE) technology enables transmission of electric power, along with data, to devices over a network cable, such as an Ethernet cable in an Ethernet network.

The PoE technology is commonly used for powering various PoE devices, such as voice over internet protocol (VoIP) telephones, wireless local area network (WLAN) access points, webcams, embedded computers, and other appliances, over the Ethernet cable. As a result, a separate power supply for powering the PoE devices would not be required. The PoE devices can be connected to communication devices, such as Ethernet switches, routers, hubs, other network switching equipments, or midspan devices.

Usually, a PoE based communication system may include different host devices connected to the communication devices. The host devices communicate communication data to the PoE devices via the communication devices. Examples of host devices may include, but are not limited to, mobile phones, smart phones, PDAs, tablets, desktop computers, laptops, servers, mainframe computers, and the like, belonging to an end user, such as an individual, a service provider, an organization, or an enterprise.

The communication devices have power connectors and network modules having ports. The power connectors may be coupled to power supply units (PSUs). Each of the PSUs may provide 12 V of operating power for operation of the network modules and 50/54 V of PoE power for the ports of the network modules.

However, for some configurations of the communication device, the total PoE power may not be fully utilized by the communication device. For example, consider a case where a communication device equipped with a single PSU is with a rated capacity of a predefined PoE power, say, 1000 W. It may happen that the PoE power consumption by the PoE devices coupled with the communication device may be less than the rated capacity, say, 500 W. As a result, the leftover PoE power of about 500 W is usually not utilized at all.

In case additional network modules are to be installed, a user has to rely on the operating power provided by the PSU to operate additional network modules. If the operating power provided for operation of the network modules is fully utilized, the user may add a new PSU. The addition of new PSU would lead to addition in unused leftover PoE power. Accordingly, in reality, there is likely hood of the leftover PoE power, and therefore the communication device is less cost effective.

In accordance with the present subject matter, devices and methods are provided to harvest the leftover PoE power for operating the additional network modules. The leftover PoE power is harvested by a PoE power harvester adapter that converts the leftover PoE power into the operating power for operating the additional network modules. The PoE power harvester adapter can be coupled to one of the standard power connectors provided on the communication device.

Further, the PoE power harvester adapter converts the leftover PoE power into the operating power of a voltage level that is less than the voltage level of the leftover PoE power. For example, the PoE power harvester adapter receives the leftover PoE power of about 54 V and converts it to the operating power of about 12 V.

The devices and methods for harvesting the leftover PoE power are further described in conjunction with the following figures. It should be noted that the description and figures merely illustrate the implementations of the present subject matter. Further, one can devise various arrangements that, although not explicitly described or shown herein, embody the implementations of the present subject matter and are included within its spirit and scope. Furthermore, all examples recited herein are only to aid the reader in understanding the examples of the present subject matter. Moreover, all statements herein reciting principles, aspects, and embodiments of the present subject matter, as well as specific examples thereof, are intended to encompass equivalents thereof.

The manner in which the devices and methods for using the leftover PoE power shall be explained in details with respect to FIGS. 1 to 4. While aspects of described devices and methods for using the leftover PoE power can be implemented in any number of environments, and/or configurations, the implementations are described in the context of the following exemplary device(s).

FIG. 1, as an example, schematically illustrates a power over ethernet (PoE) communication system 100, in which a PoE based communication device 102 is used to transfer data as well as power to remote devices, according to the present subject matter. Further, according to one implementation, the communication device 102 may be an Ethernet switch, a router, a hub, a midspan device, or other network switching equipment.

The communication device 102 receives data from host devices 106-1, 106-2, . . . , 106-N, over a network 104. The host devices 106-1, 106-2, . . . , 106-N may be collectively referred to as host devices 106. The host devices 106 may include, but are not limited to, mobile phones, smart phones, PDAs, tablets, desktop computers, laptops, servers, mainframe computers, and the like, belonging to an end user, such as an individual, a service provider, an organization or an enterprise.

Further, the network 104 may be a wireless or a wired network, or a combination thereof. In an example, the network 104 can be implemented as a computer network, as one of the different types of networks, such as virtual private network (VPN), intranet, local area network (LAN), wide area network (WAN), the internet, and such. The network 104 may either be a dedicated network or a shared network, which represents an association of the different types of networks that use a variety of protocols, for example, Hypertext Transfer Protocol (HTTP), Transmission Control Protocol/Internet Protocol (TCP/IP), to communicate with each other. Further, the network 104 may include a variety of network devices, including routers, bridges, servers, computing devices, storage devices.

The data received from the host devices 106 is communicated over Ethernet cables 108 to PoE devices 110-1, 110-2, 110-3, . . . , 110-N, collectively referred to as PoE devices 110, by the communication device 102. As noted above, the PoE devices 110 may be one of an Internet protocol (IP) phone (VoIP telephone), a wireless local access network (WLAN) access point, a webcam, an embedded computer, or other appliance adapted to receive both data and power via a standard Ethernet cable.

In one implementation, the communication device 102 includes network modules 112-1 and 112-2, collectively referred to as network modules 112. The network modules 112 may be a card, a blade, a network card, or a daughter card. The network modules 112 transmit and receive data, to and from the host devices 106 over the network 104. Further, the network modules 112 may transmit the received data to the PoE devices 110, via the Ethernet cables 108 connecting the PoE ports 114 and the PoE devices 110.

The network modules 112 have ports or PoE ports 114-1, 114-2, 114-3, . . . , 114-N, collectively referred to as PoE ports 114. The PoE ports 114 are provided at one side of the communication device 102. Further, the PoE ports 114 connect the communication device 102 with the PoE devices 110. Additionally, some or all of the PoE ports 114 are capable of providing power to the PoE devices 110 over the same communication cable used for communication of data.

Further, the communication device 102 of the communication system 100 is designed to support the PoE ports 114, and to facilitate PoE functionality for some or all of the supported PoE ports 114. For providing the PoE functionality, the communication device 102, as shown in FIG. 1, at its one side, includes power connectors 116-1, 116-2, 116-3, . . . , 116-N, collectively referred to as power connectors 116. The power connectors 116 are so formed that each power connector 116 is adapted to be coupled with one power supply unit (PSU) 118 and provide a regulated power supply to the network modules 112 and the PoE ports 114.

The PSU 118 provides power at a specified voltage from an external source, such as mains power 120. The mains power 120 is typically AC (Alternate Current) power provided from a building's electric distribution plant. This AC power is converted into DC (Direct Current) power by an electronic circuitry (shown in FIG. 2) embedded in the PSU 118. The PSU 118 provides the converted AC power as an operating power 122 for operating the network modules 112 and as a PoE power 124 for the PoE ports 114 connected to the PoE devices 110. In FIG. 1, the transmission of the operating power 122 is shown by arrow A and the transmission of the PoE power 124 is shown by arrow B. It should be noted that a reference to the operating power 122 and the PoE power 124 would also be indicative of the bus lines, interconnects or transmission means for transmitting the operating power 122 and the PoE power 124. Further, in FIG. 1, the bus lines used for transmission of the PoE power 124 are shown with dotted lines to differentiate from the bus lines of the operating power 122.

Accordingly, the PSU 118 is designed to provide both the operating power 122 for operation of the network modules 112 and the PoE power 124 for the PoE ports 114 of the network modules 112. However, for some configurations of the communication device 102, the PoE power 124 may not be fully utilized by the communication device 102. For example, in case where the communication device 102 is equipped with a single PSU 118 capable of providing a predefined PoE power 124, for example 1000 W. It may be the case that the power consumption by the communication device 102 may be less, say 500 W, than the predefined PoE power 124. In such case, the leftover PoE power, for example, of about 500 W, is usually not utilized at all. As discussed previously, in case a user has to rely on the operating power 122 to operate additional network modules. In case the operating power 122 provided for operation of the network modules 112 is fully utilized, the only option left for the user is to purchase new PSU according to the known solutions. Further, with addition of every new PSU, a total unutilized PoE power increases in the communication device 102, which makes the communication device less cost effective.

According to the present subject matter, a PoE power harvester adapter 126 is coupled to one of the power connectors 116. The PoE power harvester adapter 126 is provided to generate additional operating power based on the leftover PoE, for operating additional network modules. For generating the additional operating power, the PoE power harvester adapter 126 includes a power regulating unit (shown in FIG. 2). The power regulating unit can be a DC/DC converter or a bus converter. The power regulating unit is arranged to receive the (DC) leftover PoE power, and to convert the leftover PoE power into the additional operating power of a voltage level less than the voltage level of the leftover PoE power. For example, the power regulating unit receives the leftover PoE power of about 54 V and converts it to the additional operating power of about 12 V.

However, in an alternative implementation, it is also possible for the power regulating unit or the DC/DC converter to be of a design that gives an output voltage level higher than the PoE power 124, or to give an output voltage level that is negative with respect to the PoE power 124. Various topologies such as a "boost-converter," a "buck-boost converter," and a "single-ended primary-inductor converter (SEPIC) converter" could be used for these purposes, and they (and others) are well known in the art. Thus, in case the voltage level of the PoE power 124 may be lower than the voltage level of the operating power 122, the PoE power harvester adapter 126 harvests the lower voltage PoE power 124 and converts it to higher voltage operating power 122, for being used by the network modules 112.

Figure 2:
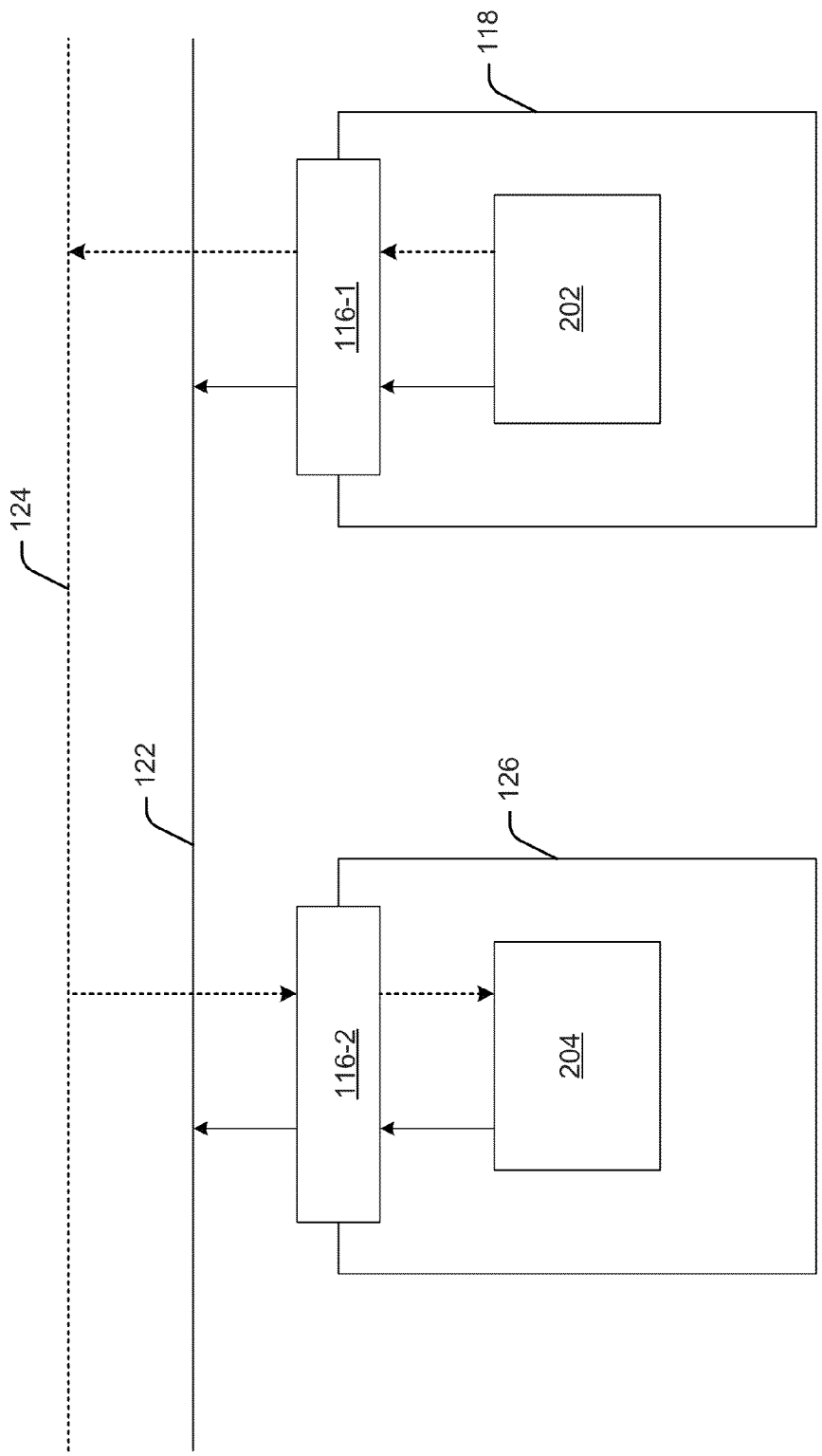
FIG. 2 illustrates a block diagram of connection of a PoE power harvester and a standard power supply unit (PSU) with a communication device, according to an example of the present subject matter.

FIG. 2 illustrates, as an example, a block diagram representing the connection of the PoE power harvester adapter 126 and the PSU 118 with the communication device 102, according to the present subject matter. As can be seen from FIG. 2, the PSU 118 provides power at a specified voltage received from an external source, such as the mains power 120 (shown in FIG. 1). The PSU 118 includes a standard electronic circuitry 202, which is adapted to receive AC power from the mains power 120 and to convert the received AC power into DC power. Further, the standard electronic circuitry 202 of the PSU 118 provides both the operating power 122 for the network modules 112 and the PoE power 124 for the PoE ports 114. The PoE power 124 delivered to the PoE ports 114 is usually communicated to the PoE devices 110 attached to the PoE ports 114, over the Ethernet cables 108. As discussed previously, for some configurations of the communication device 102, the total PoE power 124 delivered to the communication device 102 is not fully utilized. Only a part of the PoE power 124, i.e., the consumable PoE power, is consumed and the leftover PoE power is not utilized at all.

In order to harvest the leftover PoE power, the present subject matter provides the PoE power harvester adapter 126. The PoE power harvester adapter 126 is so designed that the PoE power harvester adapter 126 can be coupled to the power connector 116 designed for the PSU 118. Once the PoE power harvester adapter 126 is coupled to the power connector 116, a supporting electronic circuitry (not shown in figures) embedded on the PoE power harvester adapter 126 may provide information to the communication device 102 about the availability of additional operating power, and about the reduction in the PoE power 124.

Further, according to the present subject matter, the PoE power harvester adapter 126 includes a power regulating unit 204 arranged to receive the leftover PoE power from the PoE power 124 and convert the same to a predefined voltage level, as the additional operating power.

The power regulating unit 204 can be a DC/DC converter provided on the PoE power harvester adapter 126. The DC/DC converter may include an Intermediate Bus Converter (IBC). The IBC is a modular hot plug-in, scalable DC/DC converter that provides a well regulated and isolated output voltage. The IBC can be one of a fixed-ratio DC/DC converter (isolated or non-isolated), a line regulated DC/DC converter, and a fully regulated DC/DC converter. Further, the IBC is typically implemented in the efficient form of a switched mode power supply (SMPS) converter, which may be fully regulated or line regulated to convert the leftover PoE power into the additional operating power. The IBC provides a fixed voltage conversion ratio, i.e., input-to-output ratio, most commonly 4.5:1, 5.5:1, or 6.5:1. For example, once the input-to-output ratio of 4.5:1 is selected, then the IBC may convert the input voltage level of about 54V into a voltage level of 12V.

Further, the IBC is provided between a PoE power bus and an operating power bus. The PoE power bus feeds the IBC with the leftover PoE power which is then converted to the additional operating power by the IBC. The IBC then supplies the additional operating power at the pre-determined voltage level to Point of Loads (POLs). At each of the POLs, a network module 112 is communicatively coupled as a load. In this way, the IBC may deliver the predefined voltage level at the POLs connected to the network devices 112 provided as loads.

The PoE power harvester adapter 126 having the IBC is more efficient and cost-effective to manufacture by reason of having isolation of the IBC from an input AC power bus, which generally requires the use of relatively costly components including a transformer. This in turn makes the PoE power harvester adapter 126 less costly with respect to the standard PSUs. Because of low cost, a user can power up multiple PoE power harvester adapters 126 to provide failover redundancy. Moreover, the PoE power harvester adapter 126 has lower failure rate as compared to a standard PSU, due to lower circuit complexity and component counts.

According to the present subject matter, the IBC is provided to generate the additional operating power having voltage level of less or more than the voltage level of the PoE power 124. In one implementation, the IBC includes a converting module (not shown in Figures) and a controlling module (not shown in Figures). The converting module receives the leftover PoE power as a power input and generates the additional operating power for operating the additional network modules. The controlling module controls the converting module to convert the leftover PoE power into the additional operating power having voltage level higher than the PoE power 124, or having voltage level that is negative with respect to the PoE power 124.

The IBC or the power regulating unit 204 of the PoE power harvester adapter 126 then provides the additional operating power to operate the additional network modules, which otherwise cannot be operated without connecting a new PSU. Thus, by using the PoE power harvester adapter 126 in place of the standard PSU, the leftover PoE power is used for operating additional network modules. This in turn reduces the cost and complexity of the PoE communication system 100.

Figure 3A:
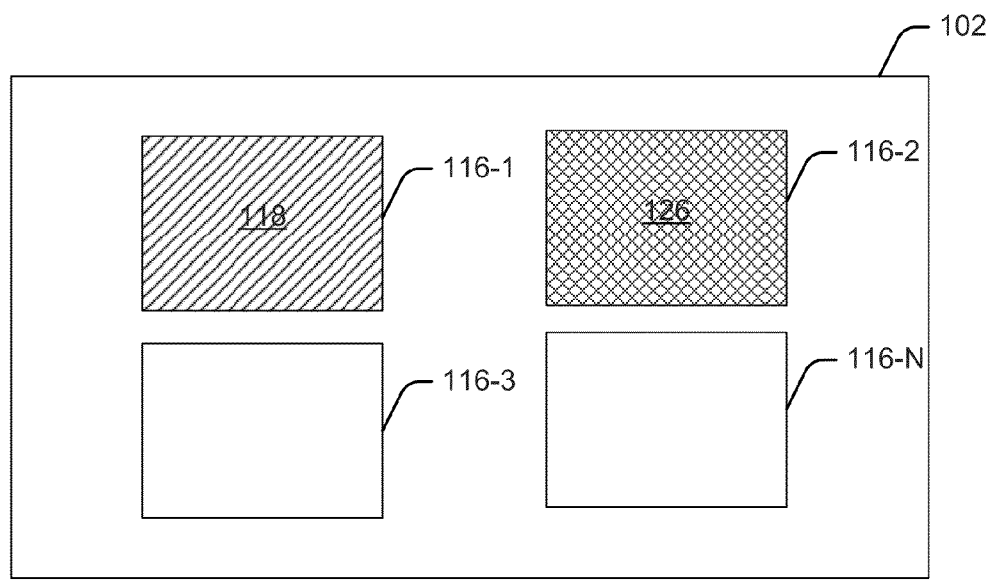
FIG. 3a illustrates a rear view of the communication device with the PoE power harvester coupled to a standard PSU slot, according to an example of the present subject matter.

FIG. 3a, as an example, illustrates a rear view of the communication device 102 with the PoE power harvester adapter 126 coupled to the power connector 116-2, according to the present subject matter. As can be seen from FIG. 3a, the communication device 102 includes the power connectors 116. In an implementation, the PSU 118 may be coupled to a power connector 116-1 to provide both the operating power 122 for the network modules 112 and the PoE power 124 for the PoE ports 114 of the network modules 112. The PoE power 124 includes a consumable PoE power for powering the PoE device 114 and a leftover PoE power.

In another implementation, the PoE power harvester adapter 126 is coupled to a power connector 116-2 to convert the leftover PoE power into additional operating power for operating additional network modules without using external power. In this way, the leftover power is conserved and an economical communication device 102 can be provided. The power connectors 116 that are still vacant can be provided with either another PoE power harvester adapter or another power supply unit depending upon the requirement of the communication device 102.

Figure 3B:
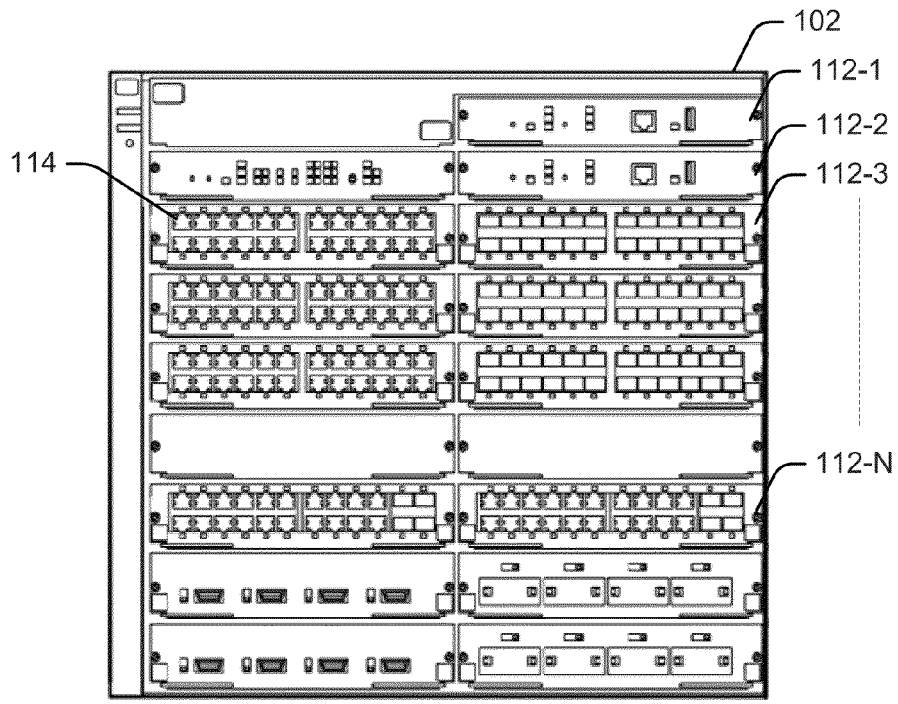
FIG. 3b illustrates a front view of the communication device with network modules, according to an example of the present subject matter.

FIG. 3b, as an example, illustrates a front view of the communication device 102, according to the present subject matter. As can be seen, in the present example, the communication device 102 is a network switch and is supporting twelve network modules 112-1, 112-2, 112-3, . . . , 112-12, collectively referred to as network modules 112. In the present example, the network switches are provided as network cards. In one example, the network cards are removable. Further, each network module 112 includes a number of PoE ports 114, out of which only one is marked for the sake of clarity. Moreover, the PoE ports 114 are connected to the PoE devices 110 over the Ethernet cables 108.

As mentioned earlier, a user has to rely on the operating power provided by the PSU 118 to operate additional network modules. In the present example, the PSU 118 can provided the operating power 122 to operate, let say, six network modules 112 out of the twelve network modules 112. Since the PSU 118 may not have capability to provide the operating power 122 for all twelve network modules 112. Now, in case there is some leftover PoE power in the communication device 102, the PoE power harvester adapter 126 can be provided to convert the leftover PoE power into additional operating power, and accordingly more than six network modules can be operated.

Figure 4:
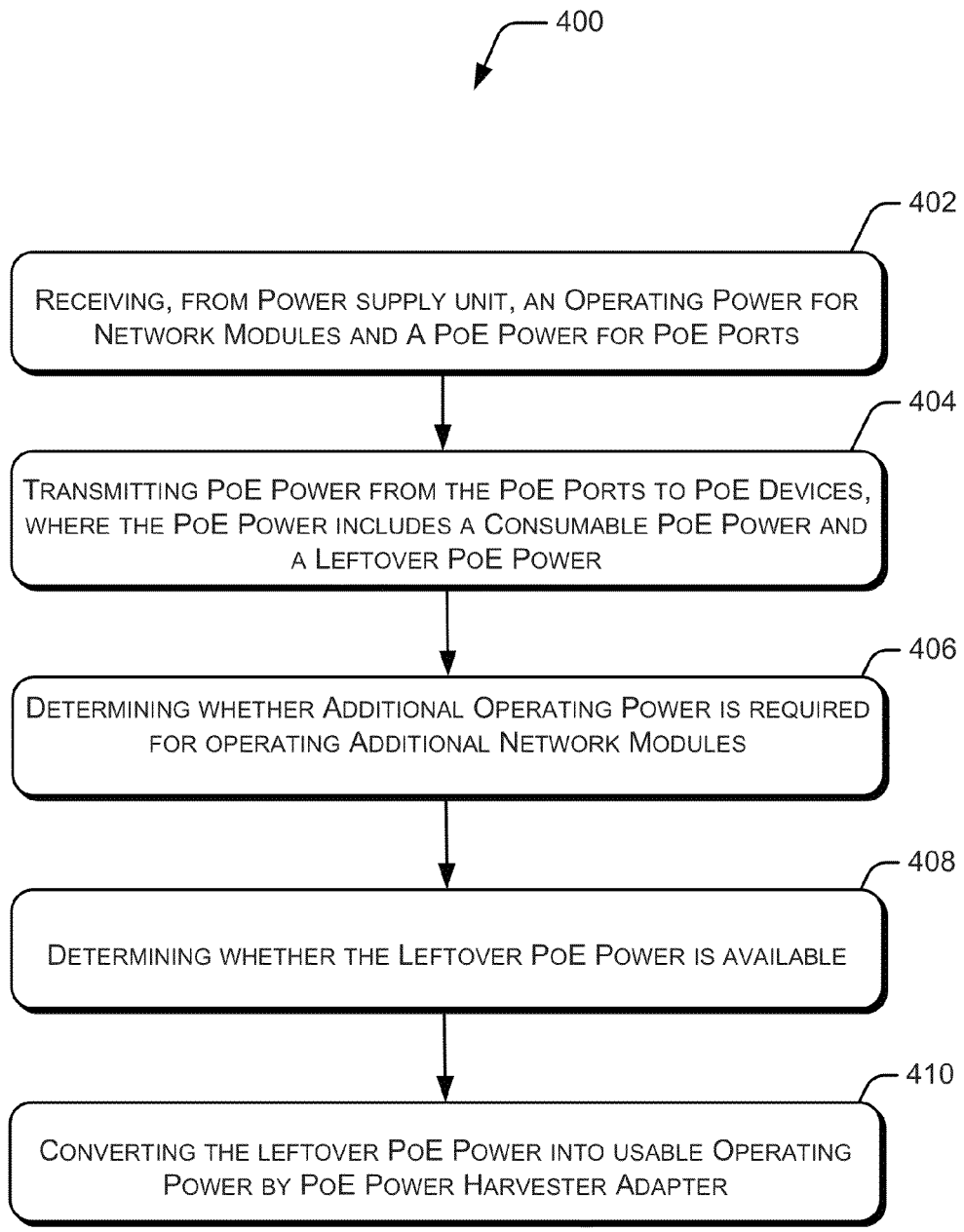
FIG. 4 illustrates a method for using leftover PoE power for operating additional network modules in the communication device, in accordance with an example of the present subject matter

FIG. 4, as an example, illustrates method 400 for using the leftover PoE power for operating additional network modules in the communication device 102, according to the present subject matter. The order in which the method 400 is described is not intended to be construed as a limitation, and any number of the described method blocks can be combined in any order to implement the method 400, or an alternative method. Additionally, individual blocks may be deleted from the method 400 without departing from the spirit and scope of the subject matter described herein.

Further, although the method 400 for data communication may be implemented in a variety of communication systems working in different communication network environments, in the principles described in FIG. 4, the method 400 is explained in context of the aforementioned PoE communication system 100 including communication devices 102, such as the switch, for the ease of explanation.

Referring to FIG. 4, as an example, at block 402, the method 400 may include receiving an operating power 122 for operation of network modules 112 and a PoE power 124 for PoE ports 114 of the network modules 112. The operating power 122 and the PoE power 124 are received from a power supply unit 118. Further, the PoE ports 114 are connected to PoE devices 110 for operating the PoE devices 110

At block 404, the method 400 may include transmitting the PoE power from the PoE ports 114 to the PoE devices 110 via Ethernet cables 108. Further, the PoE power 124 has two portions, i.e., a consumable PoE power for powering the PoE devices 110 and a leftover PoE power.

At block 406, the method 400 may include determining whether additional operating power is required for operating additional network modules or not. The determination of the additional operating power is carried out when additional network modules are to be operated and no operating power 122 is available for operating additional network modules AT block 408, the method 400 may include determining the leftover PoE power from the transmitted PoE power 124. In case the leftover power is available, a PoE power harvester adapter 126 is coupled with a connector 116-2 provided for the PSU 118.

At block 410, the method 400 may include converting the leftover PoE power into the additional operating power for operating the additional network modules. The conversion is performed by the PoE power harvester adapter 126. Thus, by using the PoE power harvester adapter 126, the leftover PoE power is used for operating the additional network modules.

CONCLUSION

Although examples for the communication device 102 and the PoE power harvester adapter 126 have been described in language specific to structural features and/or methods, it is to be understood that the appended claims are not necessarily limited to the specific features or methods described. Rather, the specific features and methods are disclosed as exemplary implementations for Power over Ethernet (PoE) communication systems.

We claim:
1. A communication device comprising:
a power connector;
network modules having ports, the ports to provide connection to Power over Ethernet (PoE) devices over an Ethernet network;
a power supply unit coupled to the power connector, the power supply unit to provide,
an operating power for operation of the network modules of the communication device; and
a PoE power for the ports, the PoE power comprising a consumable PoE power for powering the PoE devices, and a leftover PoE power;
a transmission line to provide the consumable PoE power from the power connector through the ports and over the Ethernet network to the PoE devices;
a first PoE power harvester adapter to harvest the leftover PoE power for converting the leftover PoE power into further operating power for powering at least one additional network module; and
a second PoE power harvester adapter, the first and second PoE power harvester adapters providing failover redundancy.

2. The communication device as claimed in claim 1, wherein the first PoE power harvester adapter is to output the further operating power having a voltage level different from a voltage level of the PoE power.

3. The communication device as claimed in claim 1, wherein the first PoE power harvester adapter comprises a DC-DC converter to convert the leftover PoE power at a first voltage level into the further operating power at a second, different voltage level.

4. The communication device as claimed in claim 1, wherein the first PoE power harvester adapter comprises an intermediate bus converter to convert the leftover PoE power at a first voltage level to the further operating power at a second, different voltage level.

5. The communication device as claimed in claim 1, wherein the communication device is to receive data from and transmit data to host devices.

6. The communication device as claimed in claim 5, wherein the communication device is to communicates the data, received from the host devices, along with the PoE power to the PoE devices over the Ethernet network.

7. A method comprising:
receiving, from at least one power supply unit connected to at least one power connector of a communication device, an operating power for network modules in the communication device and a Power over Ethernet (PoE) power for ports of the network modules, the ports coupled to PoE devices over an Ethernet network, the PoE power comprising a consumable PoE power and a leftover PoE power;
transmitting the consumable PoE power from the at least one power connector over a transmission line in the communication device through the ports and over the Ethernet network to the PoE devices;
determining, by the communication device, whether additional operating power is to be provided for operating at least one additional network module;
in response to determining that the additional operating power is to be provided for operating the at least one additional network module, converting, by at least a first PoE power harvester adapter of the communication device, the leftover PoE power into the additional operating power for operating the at least one additional network module; and
providing failover redundancy using the first PoE power harvester adapter and a second PoE power harvester adapter of the communication device.

8. The method as claimed in claim 7, wherein the converting comprises:
   transforming, by a DC-DC converter of the first PoE power harvester adapter, the leftover PoE power at a first voltage level into the additional operating power at a second, different voltage level.

9. The method as claimed in claim 7, further comprising:
   receiving communication data at the ports of the network modules of the communication device from host devices;
   transmitting, by the communication device, the communication data along with the consumable PoE power from the ports and over the Ethernet network to the PoE devices.

10. The communication device as claimed in claim 1, wherein the network modules are to receive data from at least a first device over a network and to send the received data through the ports and over the Ethernet network to the PoE devices, the Ethernet network comprising Ethernet cables.

11. The communication device as claimed in claim 1, wherein the power connector is a first power connector connected to the power supply unit, and the communication device further comprises a second power connector connected to the first PoE power harvester adapter.

12. The communication device as claimed in claim 11, wherein the first PoE power harvester adapter includes a hot-plug-in DC-DC converter to convert the leftover PoE power to the further operating power.

13. The communication device as claimed in claim 11, wherein the first PoE power harvester adapter is external of the communication device and is to connect to the communication device through the second power connector.

14. The communication device as claimed in claim 13, wherein the power supply unit is external of the communication device and is to connect to the communication device through the first power connector.

15. The method as claimed in claim 7, further comprising:
   receiving, by the network modules, data from at least a first device over a network; and
   sending, by the network modules, the received data through the ports and over the Ethernet network to the PoE devices.

16. The method as claimed in claim 7, wherein the at least one power connector includes at least a first power connector connected to the at least one power supply unit, and the communication device further comprises a second power connector connected to the first PoE power harvester adapter, the first PoE power harvester adapter being external of the communication device and connected to the communication device through the second connector.

17. A communication device comprising:
   a power connector;
   network modules having ports, the ports to provide connection to Power over Ethernet (PoE) devices over an Ethernet network, the network modules to receive data from at least a first device over a network and to send the received data through the ports and over the Ethernet network to the PoE devices, the power connector to receive, from a power supply unit coupled to the power connector,
   an operating power for operation of the network modules of the communication device; and
   a PoE power for the ports, the PoE power comprising a consumable PoE power for powering the PoE devices, and a leftover PoE power;
   a transmission line to provide the consumable PoE power from the power connector through the ports and over the Ethernet network to the PoE devices;
   a first PoE power harvester adapter to harvest the leftover PoE power for converting the leftover PoE power into further operating power for operating at least one additional network module; and
   a second PoE power harvester adapter, the first and second PoE power harvester adapters providing failover redundancy.

18. The communication device as claimed in claim 17, wherein the first PoE power harvester adapter comprises a DC-DC converter to convert the leftover PoE power at a first voltage level to the further operating power at a second, different power level.

19. The communication device as claimed in claim 17, wherein the power connector is a first power connector for connection to the power supply unit, and the communication device further comprises a second power connector connected to the first PoE power harvester adapter, the first PoE power harvester adapter being external of the communication device and connected to the communication device through the second connector.

* * * * *